United States Patent
Hübinette

(10) Patent No.: US 6,289,511 B1
(45) Date of Patent: Sep. 11, 2001

(54) METHOD AND SYSTEM FOR DISTRIBUTING SOFTWARE IN A TELECOMMUNICATIONS NETWORK

(75) Inventor: Ulf Hübinette, Linköping (SE)

(73) Assignee: Telephonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/162,744

(22) Filed: Sep. 29, 1998

(51) Int. Cl.[7] .................................................. G06F 9/445
(52) U.S. Cl. ................................... 717/11; 709/223
(58) Field of Search ...................... 717/11; 455/423; 707/203, 201; 709/221, 237, 239, 223; 714/4

(56) References Cited

U.S. PATENT DOCUMENTS

| | | | |
|---|---|---|---|
| 5,155,847 | 10/1992 | Kirouac et al. | 709/221 |
| 5,297,193 | 3/1994 | Bouix et al. | 455/423 |
| 5,307,354 | * 4/1994 | Cramer et al. | 714/4 |
| 5,513,324 | * 4/1996 | Dolin, Jr. et al. | 709/237 |
| 5,579,318 | 11/1996 | Reuss et al. | 370/410 |
| 5,586,310 | 12/1996 | Sharman | 707/10 |
| 5,654,901 | 8/1997 | Boman | 717/11 |
| 5,701,427 | * 12/1997 | Lathrop | 709/237 |
| 5,706,431 | * 1/1998 | Otto | 709/221 |
| 5,742,829 | 4/1998 | Davis et al. | 717/11 |
| 5,806,075 | * 9/1998 | Jain et al. | 707/201 |
| 5,835,911 | * 11/1998 | Nakagawa et al. | 707/203 |
| 6,018,773 | * 1/2000 | Watanabe | 709/239 |

FOREIGN PATENT DOCUMENTS

WO 96/24231 * 8/1996 (WO) ........................... G06F/9/445

OTHER PUBLICATIONS

Software Custom Installation For Nodes In A Network IBM Technical Disclosure Bulletin, vol. 34 No. 10A, Mar. 1, 1992 pp. 13–17, XP000302206.

Standard Search Report for RS 101982 US completed on Dec. 18, 1998, Dec. 22,1998, EPO.

* cited by examiner

Primary Examiner—Kakali Chaki
Assistant Examiner—Hoang-Vu Antony Nguyen-Ba
(74) Attorney, Agent, or Firm—Jenkens & Gilchrist, P.C.

(57) ABSTRACT

A method and system of a computer network enables efficient and reliable software distribution by disbursing the responsibility for loading software. A computer network is composed of, for example, a central managing station (CMS), multiple major network elements (NEs), and possibly multiple subordinated NEs (S-NEs) connected to major NEs. The CMS and the NEs are preferably connected to a network, such as an X.25 network. The CMS includes a load manager (LM) and at least one software unit to be distributed to multiple NEs and/or S-NEs. Multiple NEs include a load agent (LA), which aids the LM with software distribution. At least one particular LA receives instructions as well as the software unit from the CMS under control of the LM and via the network. The particular LA is then responsible for loading the software unit onto other NEs, either fully or partially. The process of upgrading and/or installing software is therefore delegated and disbursed between and among multiple NEs.

30 Claims, 6 Drawing Sheets

METHOD AND SYSTEM FOR DISTRIBUTING SOFTWARE IN A TELECOMMUNICATIONS NETWORK

BACKGROUND OF THE INVENTION

1. Technical Field of the Invention

The present invention relates in general to the field of networked computing elements, and in particular, to efficient and partly autonomous distribution of software in order to load (e.g., install or upgrade) software onto the individual elements of the network.

2. Description of Related Art

Computer software is rapidly changing in today's computing environment. New programs are introduced and older programs are constantly improved. This leads to an ability, and often a requirement in order to remain competitive, to frequently load software onto a computing element. The software loading may include installation of new software and/or upgrading of existing software. Originally, an operator physically visited each computer to perform a software load.

When computers are networked, however, software may be loaded from a central computer over the network to individual computing elements. Computing equipment in network elements (NEs) of telecommunications networks are among those computers that benefit from remote loading of software. In fact, remote loading is considered a key factor for achieving better profitability when upgrading and updating an existing installed base of NEs. Operators of telecommunications networks benefit from remote software loading for, for example, their switches and base stations (BSs). One exemplary benefit is faster introduction of new features into existing networks, thus increasing the revenue of operators. Consequently, the providers of network equipment and upgrade services experience a concomitant increase of revenue.

When remote loading of software in switches, BSs, and other NEs is performed, large files with the relevant software information (e.g., upgrade information) are transferred from a remote site to each one of the NEs, which are often geographically distributed. The remote site uses data communication link(s) (either physical or logical) to each of the NEs. During an upgrade process, for example, files that contain software needed for the upgrade are distributed via the communication link(s) from a local file store (FS) at the remote site. The files may be distributed to multiple NEs, where the files may be stored in a local storage media (LSM) (e.g., an Input Output Group (IOG), which is a version of the Ericsson AXE input/output part).

The time for starting the distribution is specified as well as whether the distribution is to be accomplished sequentially or in parallel (i.e., using one or several physical connections). After the files have been transferred to the target NEs, the remote site sends commands (e.g., a Man-Machine Language (MML) command) to the relevant NEs instructing them to switch over to the new software. The remote site may include an Operations Support System (OSS) that contains support for the remote loading (e.g., support for effectuating file transfer and command handling).

While the above-described procedure may enable remote software file loading, it nevertheless suffers from a lack of robustness. For example, remote loading often entails transferring large amounts of data over low capacity links. Furthermore, all control of the remote loading is centralized to one managing station (e.g., the OSS) as well as the single link (or few links) between the centralized managing station (CMS) and the targeted NEs. Consequently, the CMS as well as its link(s) become of critical importance with respect to both transfer capacity and reliability during the loading process. If either is jeopardized due to, for example, physical or logical damage or capacity overloading, then the software distribution procedure is also jeopardized.

SUMMARY OF THE INVENTION

The deficiencies of the prior art are overcome by the method and system of the present invention. For example, as heretofore unrecognized, it would be beneficial if software loading continues after a critical link between a CMS and the remainder of the network is severed. In fact, it would be beneficial if software loading is disbursed among the NEs of the network such that one NE (or multiple NEs) may provide to another NE (or many other NEs) software and optionally thereafter cause the NE (or many other NEs) to load the software.

A method and system of a network enables efficient and reliable software distribution based on, at least in part, disbursing the responsibility for the loading of the software. A network includes, for example, a CMS and multiple NEs. The CMS and multiple NEs may be directly connected to a single level of a network hierarchy. According to one embodiment of the invention, the CMS transfers to at least one NE instructions for loading software and the software to be loaded. The at least one NE may subsequently provide both the software and the commands for loading the software to other NEs. The time that is required to complete the loading process for the entire network may therefore be minimized.

According to another embodiment, the CMS includes a load manager (LM) that controls the loading of software (e.g., the installing of new software, the upgrading of preexisting software, etc.) throughout either a portion of the network or throughout the entire network. Each NE further includes a load agent (LA) that receives software and instructions from the LM. Such NEs may be termed primary NEs when they receive software directly from the CMS. The LAs of the primary NEs may then implement the instructions and control the loading of software onto other NEs (e.g., secondary NEs) via their respective LAs. The secondary NEs may correspondingly then load software onto tertiary NEs as well as any subordinated NEs (S-NEs) that are directly connected to the tertiary NEs. The distribution procedure may proceed through as many phases as planned by the CMS.

According to yet another embodiment, the network also includes multiple S-NEs. A single or a group of S-NE(s) may be directly connected to an NE on a subordinate level of the network hierarchy. Each NE may load software onto the S-NE(s) directly connected thereto based on instructions therein or received from the CMS. The loading of software onto the S-NE(s) of a particular NE may be performed prior to, simultaneously with, or after the particular NE updates other NEs.

According to yet another embodiment, the LM sends to the LA of a target NE, in addition to the software to be loaded (and optionally files with instructions for loading the software), an assignment or assignments for wholly or partially loading software onto other NEs. The assignment(s) specify a number of loading options. These options include, for example, (1) address(es) of secondary, tertiary, etc. target NEs, (2) scheduled times for loading and activating the software, and (3) description(s) of which parts of received software are to be forwarded to other NEs or S-NEs.

An important technical advantage of the present invention is that it enables reliable and efficient software distribution by replicating software-loading points of origin.

Another important technical advantage of the present invention is that it enables reliable and efficient software distribution by multiplying software loading transmission links.

Yet another important technical advantage of the present invention is that it provides LAs in NEs that relieve a centrally-located LM from at least some software loading responsibilities and that are prepared to respond to network failures.

Yet another important technical advantage of the present invention is the ability to provide simple or detailed assignments (s) to NEs in one phase of the distribution for use in the next phase of the distribution and optionally for perpetuating the distribution.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE DRAWINGS

A preferred embodiment of the present invention and its advantages are best understood by referring to FIGS. 1–4C of the drawings, like numerals being used for like and corresponding parts of the various drawings.

The principles of the present invention are applicable to networks in general. However, and without limitation, certain aspects of the present invention are described in the context of a telecommunications system. For example, the wired portion (e.g., Mobile Services Switching Centers (MSCs), BSs, etc.) of a wireless network system are referred to in an exemplary embodiment. More specifically, aspects of the Personal Digital Cellular System (PDC) of Japan (RCR STD-27F) (formerly called the Japanese Digital Cellular System (JDC)) will be used to describe embodiments of the present invention.

Figure 1A:
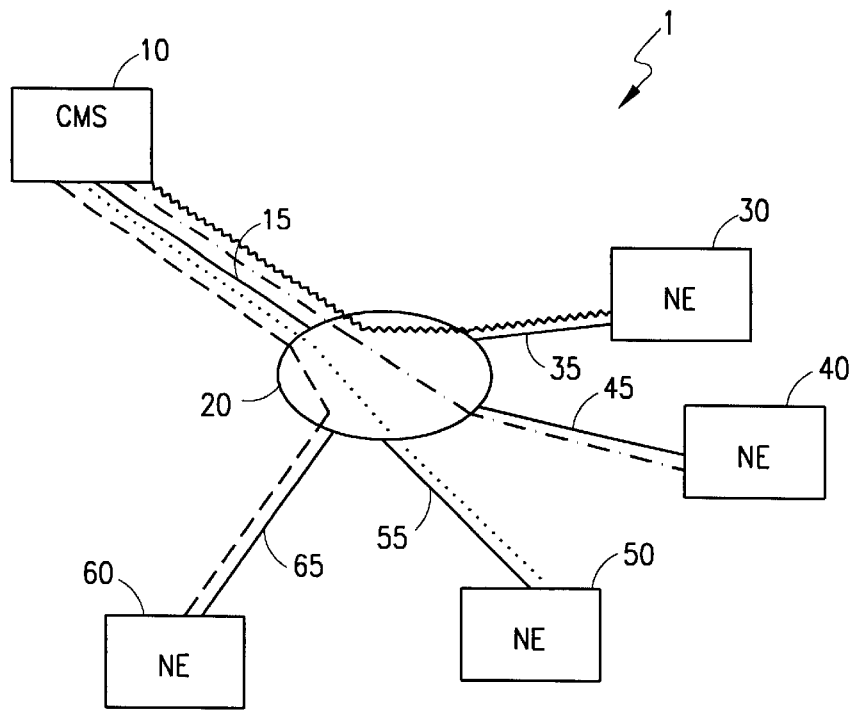
FIG. 1A illustrates a conventional network software loading procedure.

Referring now to FIG. 1A, a conventional network software loading procedure is illustrated. A telecommunications network 1 is shown with a CMS node 10 connected to a network 20 via a communication link 15. Four NE nodes 30, 40, 50, and 60 are also connected to the network 20 via communication links 35, 45, 55, and 65, respectively. When software is to be loaded onto the NE nodes 30, 40, 50, and 60 from the CMS node 10, the CMS node 10 transmits the software over the communication link 15 to the network 20 and then over the communication links 35, 45, 55, and 65 to the NE nodes 30, 40, 50, and 60, respectively. Each transmission is indicated by a line. A zigzag line, a dashed-dotted line, a dotted line, and a dashed line represent the transmission to each of the NE nodes 30, 40, 50, and 60, respectively. Notably, each software loading is controlled by the CMS node 10 and is transmitted over the single critical communication link 15.

Figure 1B:
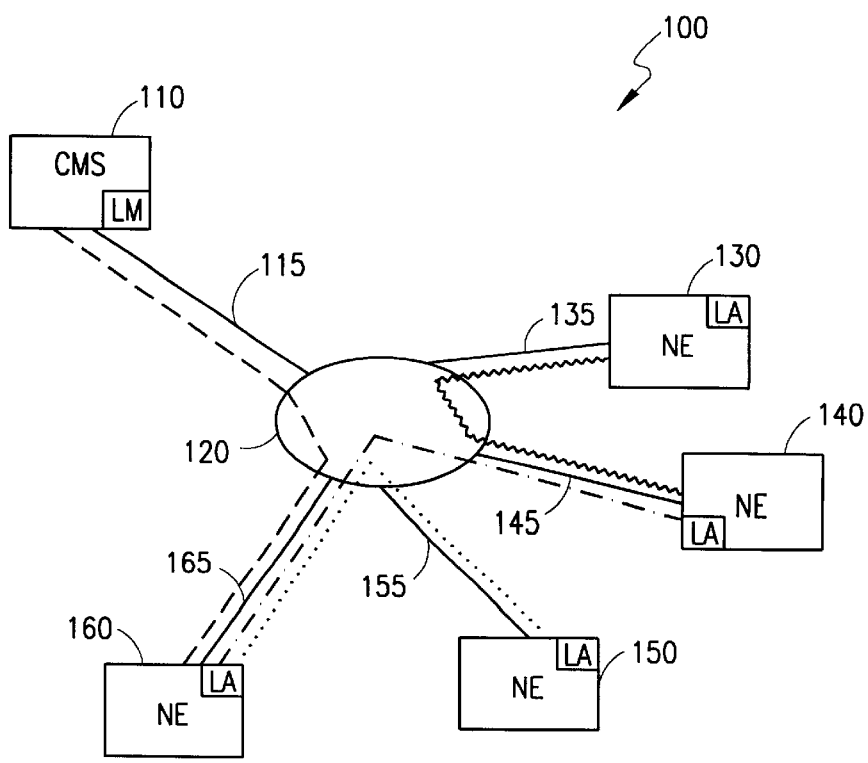
FIG. 1B illustrates a network software distribution and loading procedure in accordance with one embodiment of the present invention.

The present invention advantageously disburses the software loading responsibilities so as (i) to reduce the impact of a failure of either the CMS node or the communication link that links the CMS node to the network and (ii) to minimize the total duration of the software loading procedure. Referring now to FIG. 1B, a network software distribution and loading procedure in accordance with one embodiment of the present invention is illustrated. An exemplary telecommunications network 100 is shown with a CMS node 110 connected to a network 120 via a communication link 115. Four NE nodes 130, 140, 150, and 160 are also connected to the network 120 via communication links 135, 145, 155, and 165, respectively. When software is to be loaded onto the NE nodes 130, 140, 150, and 160 from the CMS node 110, the CMS node 110 employs the principles of the present invention to disburse the software distribution responsibilities. In accordance with the present invention, an LM at the CMS node 110 and LAs at each of the NE nodes 130, 140, 150, and 160 are illustrated; both will be explained in further detail below. Although only four NE nodes are illustrated for the sake of clarity, many additional nodes may be included as part of the telecommunications network 100.

Each transmission of the software to be loaded and the accompanying instructions (if any) is indicated by a line. A zigzag line, a dashed-dotted line, a dotted line, and a dashed line represent the transmission(s) to each of the NE nodes 130, 140, 150, and 160, respectively. The CMS node 110 transmits the software and a first assignment, which includes instructions for further loading to other NE nodes, to the NE node 160 over the communication link 115 to the network 120 and then over the communication link 165 to the NE node 160. This transmission is represented by the dashed line. The NE node 160 interprets the first assignment and then implements the corresponding instructions.

First, the NE node 160, in response to the first assignment, transmits the software to be loaded to the NE node 150 over the communication link 165 to the network 120 and then over the communication link 155 to the NE node 150. This transmission is represented by the dotted line. Second, the NE node 160 transmits the software to be loaded and a second assignment (with different instructions) to the NE node 140 over the communication link 165 to the network 120 and then over the communication link 145 to the NE node 140. This transmission is represented by the dashed-dotted line. Third, the NE node 140 interprets the second assignment and then implements the corresponding instructions. The NE node 140, in response to the second assignment, transmits the software to be loaded to the NE node 130 over the communication link 145 to the network 120 and then over the communication link 135 to the NE node 130. This transmission is represented by the zigzag line. In the example described above, the NE node 160 is a primary target because it receives the software directly from the CMS node 110. Consequently, the NE nodes 140 and 150 are secondary targets, and the NE node 130 is a tertiary target.

It should be noted that the CMS node 110 may, for example, alternatively transmit the software for loading (as well as optionally an assignment) to second, third, etc. nodes in addition to the NE node 160. It should also be noted that the software loading may occur in any order, for the present invention is not limited to the order in which the loading is described above. For example, total network loading time may be reduced as compared to the order described above by instructing the NE node 160 (e.g., in the first assignment) to transmit the software and second assignment to the NE node 140 prior to transmitting the software to the NE node 150. As a result, the NE nodes 160 and 140 may cause the loading of software onto the NE nodes 150 and 130, respectively, to occur simultaneously. Furthermore, as is explained further below, instructions regarding commands to activate the recently-loaded software may also be sent to and implemented by the NE nodes. Notably, software loading of multiple NE nodes in accordance with the present invention may occur simultaneously and without relying on a single critical node or communication link that may fail.

Figure 2:
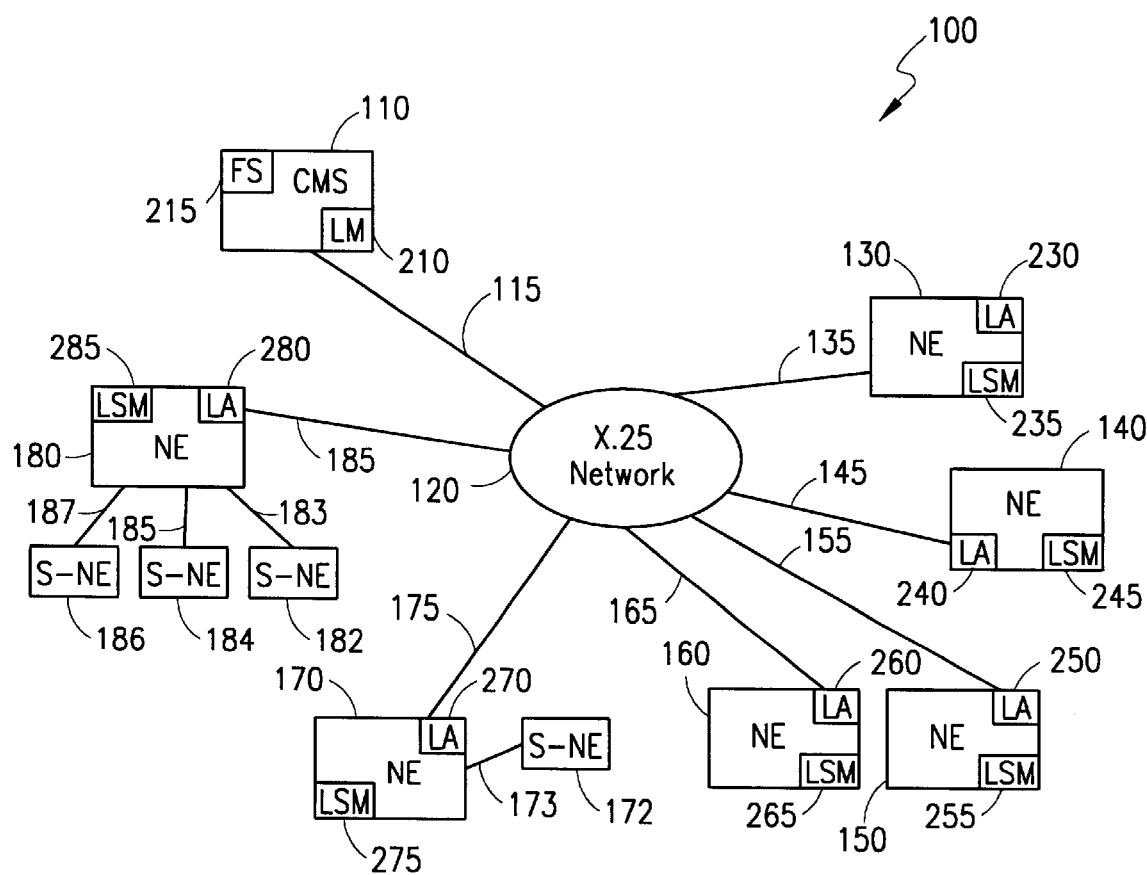
FIG. 2 illustrates a telecommunications network in accordance with another embodiment of the present invention.

Referring now to FIG. 2, a telecommunications network in accordance with another embodiment of the present invention is illustrated. In the exemplary telecommunications network 100, two additional NE nodes, NE nodes 170 and 180, are connected via communication links 175 and 185, respectively, to the network 120 at one hierarchical level of the telecommunications network 100. Also, an S-NE node 172 is connected to the NE node 170 via communication link 173, and S-NE nodes 182, 184, and 186 are connected to the NE node 180 via communication links 183, 185, and 187, respectively, at a subordinate hierarchical level of the telecommunications network 100. It should be understood that one or more of the S-NE nodes may also be directly connected to the X.25 network instead of being connected through an NE node.

In the exemplary telecommunications network 100, network 120 is shown to be an exemplary X.25 network, which is governed by known protocols. The X.25 network may be either public or private. Virtual Circuits (VCs) (e.g., Switched Virtual Circuits (SVCs) and/or Permanent Virtual Circuits (PVCs)) in the X.25 network may be established from any NE node to any other NE node and from the CMS node 110 to any NE node. The CMS node 110 may be, for example, an OSS. The NE nodes 130, 140, 150, 160, 170, and 180 may be, for example, an MSC while the S-NE nodes 172, 182, 184, and 186 may be, for example, small BSs. The CMS node 110 includes an FS 215 and each NE node (130, 140, 150, 160, 170, and 180) includes an LSM (235, 245, 255, 265, 275, and 285, respectively). The FS 215 and the LSMs may be composed of volatile working memory (e.g., RAM) and/or nonvolatile storage memory (e.g., a Redundant Array of Independent Disks (RAID)). Software (and related data) to be distributed across the telecommunications network 100 and loaded into the NE nodes is stored within the FS 215. The software may be, for example, an entire suite of programs, a single program, a module, a subroutine, etc.

Applications in accordance with the present invention are included in various nodes of the telecommunications network 100. An LM 210 application is located at the CMS node 110. An LA (230, 240, 250, 260, 270, and 280) application is located at each of the NE nodes (130, 140, 150, 160, 170, and 180, respectively). Each application may be software, firmware, hardware, etc. or some combination thereof, Also, each application may be stored in either (or both of) a volatile or nonvolatile portion of the node's memory. The LAs may be initially downloaded via the network 120 to the NE nodes and installed under control of the CMS node 110 (e.g., using the LM 210).

Figure 3:
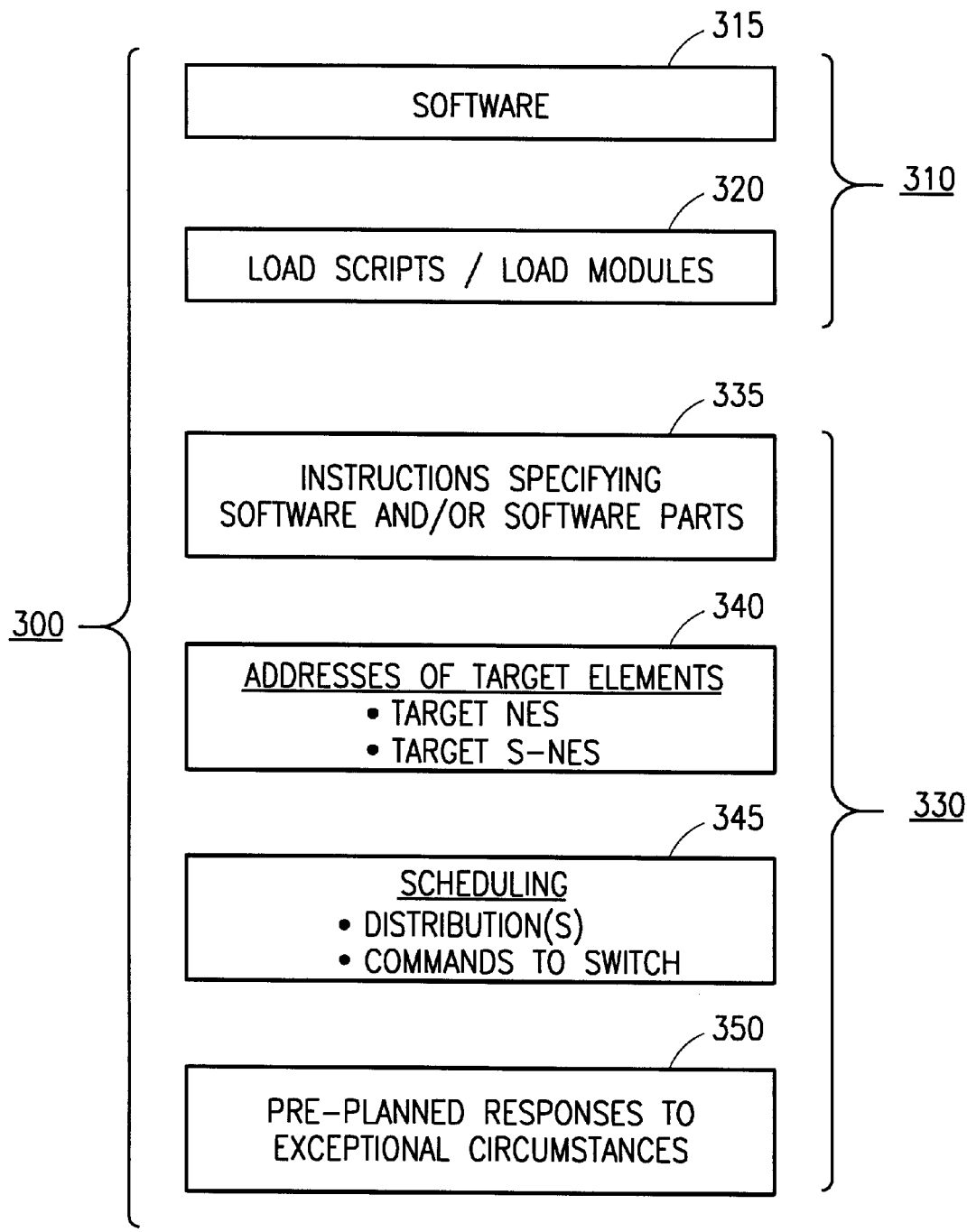
FIG. 3 illustrates information related to software distribution in accordance with the present invention.

Referring now to FIG. 3, information related to software distribution in accordance with the present invention is illustrated. The information is denoted generally by element number 300 and its associated bracket. The element number 310 and its associated bracket jointly pertain to software-loading related file or files 310. As part of the software-loading related file(s) 310, software 315 represents the software which is to be distributed (e.g, transmitted and loaded) throughout all or a part of the network 100. Also included is one or more load script(s)/load module(s) 320. Load scripts refer to a series or set of instructions which dictate how the software is to be loaded. Load modules, on the other hand, refer to an executable file that may be executed in order to load the software 315. The term "load files" is a general term encompassing at least load script(s) and load module(s). However, load scripts is used herein for brevity and clarity, without limitation. The software 315 and the load script(s) 320 are located in the FS 215 of the CMS node 110 (hereinafter CMS 110) of the network 100. The CMS 110 may therefore transmit the software 315 and the load script(s) 320 via the communication link 115 and under the control of the LM 210.

With continuing reference to FIG. 3, element number 330 and its associated bracket jointly pertain to one or more assignment(s) that may be sent over the network 100 in order to distribute software. When an NE node (hereinafter NE) receives an assignment or assignments 330, the NE carries out the assignment(s) 330 by causing software to be loaded onto other NEs as specified by the assignment(s) 330. The task of loading software across the network 100 may thereby be disbursed to one or more NEs across the network 100. The assignment(s) 330 may include instructions specifying software and/or software parts 335. The instructions that specify the software and/or software parts 335 indicate which software or portions of software of the software 315 should be transmitted to other NEs.

As explained above, while the software-loading related files 310 are sent from the CMS 110 uging the network 120 to a particular NE for loading software onto that NE, the assignment(s) 330 are sent to that particular NE in order that that particular NE may subsequently cause other NEs to load all or portions of the software 315. The assignment(s) 330 specify how the software-loading responsibilities are to be disbursed throughout the network 100. The instructions specifying software and/or software parts 335, therefore, specify which portions of (including all of) the software 315 are to be distributed in a second distribution phase to secondary NEs from the primary NEs, which received the software-loading related files 310 and the assignment(s) 330 directly from the CMS 110 in a first distribution phase.

An example is used to illuminate the principles of the present invention in conjunction with the following description of the accompanying drawings. It should be understood that the example that follows is not to be considered as limiting the present invention. As explained above, a primary NE is any NE whose software is updated directly under the control, guidance, or instructions of the CMS 110. A secondary NE is any NE whose software is loaded under the direct control, guidance, or instructions of a primary NE. A tertiary NE, therefore, is any NE whose software is loaded under the direct control, guidance, or instructions of a secondary NE.

In this example, the CMS 110 transmits software, etc. to primary NEs 130, 160, and 180 in a first phase of a software distribution. The "etc." aspect of the transmissions represents various components of the software-loading related files 310 and/or the assignment(s) 330 as will be explained in greater detail hereinbelow with respect to individual distributions. The primary NE 160 transmits software, etc. to the secondary NE 150 in a second phase of the distribution. Also in the second phase of the distribution, the primary NE 180 transmits software, etc. to secondary NEs 140 and 170 and to the S-NEs 182 and 184. In a third phase of the distribution, the secondary NE 170 transmits software, etc. to the S-NE 172. Furthermore, the software 315, in this exemplary software distribution, includes parts A and B. No tertiary, etc. NEs are included in this example, but many more distribution phases are possible as will be apparent to one skilled in the art after reading and understanding the principles of the present invention.

The assignment(s) 330 (of FIG. 3) may also include addresses of target elements 340. The addresses of the network 120, and therefore the addresses specified in the addresses of target elements 340, may be X.25 network addresses, for example. The addresses of target elements 340 specify which NEs and possibly S-NEs are to be the target of the software-loading procedure. For example, when the CMS 110 in accordance with the current example transmits the software-loading related files 310 and the assignment(s) 330 to the NE 180, the addresses of target elements 340 may include the address of the NE 140 and the NE 170 because these are to be secondary targets of the NE 180. Furthermore, the addresses of target elements 340 may include addresses of S-NEs 182 and 184 because these S-NEs are to be targets of the software-loading procedure as well in the current example. Furthermore, the S-NEs 182 and 184 may only be receiving Part B of the software 315 in accordance with the data/instructions of the instructions specifying software and/or software parts 335.

The assignment(s) 330 may also include scheduling information 345. The scheduling information 345 includes timing parameters with respect to both (i) distribution or distributions and (ii) commands to switch from prior software to recently-distributed software 315 (e.g., to activate the recently-distributed software 315). Continuing with the current example, the distribution timing aspect of the scheduling information 345 may specify that the NE 180 is to transmit the software-loaded related files 310 to the NE 170 and the NE 140 at 2:00 a.m. of a given day. The command(s) to switch aspect of the scheduling information 345 may further specify that the NE 180 is to issue a command to the NE 170 and the NE 140 at 3:00 a.m. on the following day, for example, at which time the NE 170 and the NE 140 switch from the prior software to the software received at 2:00 a.m. of the preceding day. It should be understood that commands are not necessary in all embodiments of the present invention because, for example, instructions to activate the software 315 may be included, for example, in the load script(s) 320.

The assignments 330 may also include provisions for responding to unusual circumstances in the form of preplanned responses to exceptional circumstances 350. Continuing with the current example, the preplanned responses to exceptional circumstances 350 may include, for example, provisions on how the NE 180 is to respond in the event that the NE 170 cannot be contacted. If the NE 170 does not affirmatively respond by acknowledging reception of the software-loading related files 310 from the NE 180, the NE 180 may (in accordance with the preplanned responses to exceptional circumstances 350) attempt to retransmit the software-loading related file(s) 310 on a succeeding day and/or for a predetermined number of attempts. Additionally, the preplanned responses to exceptional circumstances 350 may instruct the NE 180 on what to do in the event that the NE 140 malfunctions after switching to the recently-received new software 315. If the NE 140 crashes or otherwise malfunctions after activating the software 315, the NE 180 may be required to instruct or command the NE 140 to return to the prior version of the software (or merely cease using the new software 315 if the software 315 is a new module and not merely an update or replacement for an old module).

Figure 4A:
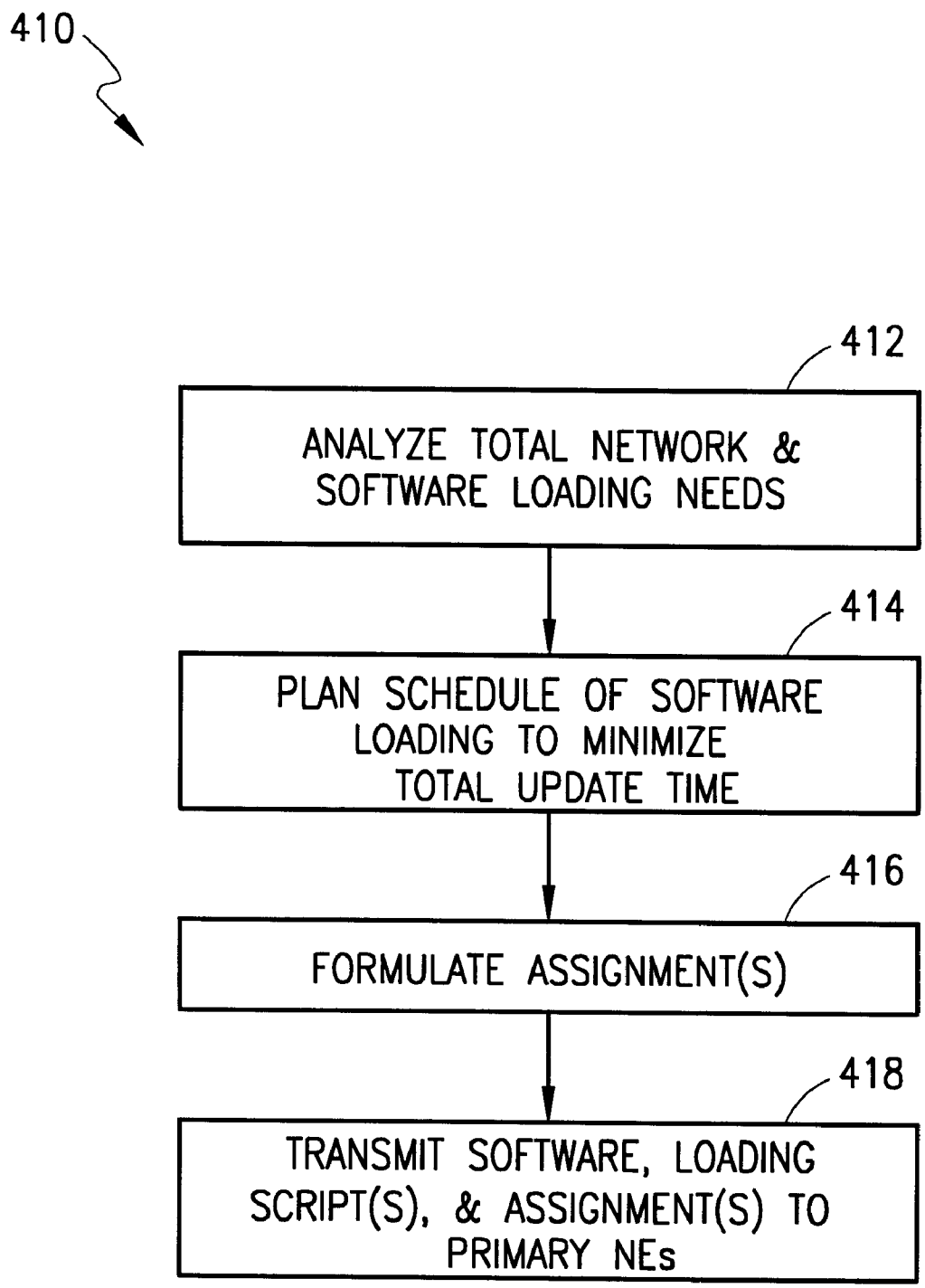
FIG. 4A illustrates a method in flowchart form for distributing software in accordance with one aspect of the present invention.

Referring now to FIG. 4A, a method in flowchart form for distributing software in accordance with one aspect of the present invention is illustrated. The flowchart 410 is directed towards aspects of software distribution related to the CMS 110. Initially, the CMS 110 analyses the entire network 100 or a part or relevant portion thereof and determines the software loading requirements (step 412). The CMS 110 determines, in part, which portions of the software 315 should be distributed to which of the nodes in the network 100 (e.g., only Part B of the software 315 is transmitted to the S-NEs 182 and 184 in the current example).

The CMS 110 may optionally plan the schedule of software distributing so as to minimize the total update time for the network 100 (step 414). For instance, network nodes with similar software may be upgraded as a group. The upgrading of network nodes as a group, in this context, implies that a first network node with a particular software configuration upgrades a second network node with an equivalent or identical software configuration. In another exemplary instance, the network 100 may be divided into segments or areas. Each segment or area may then be analyzed individually, and the efficiency of the software loading procedure may be maximized individually therein. As yet another exemplary instance, the software loading procedure may be designed such that each NE updates another NE during each phase of the software distribution. In other words, the CMS 110 may load software onto a first NE in the first phase. In a second phase, the first NE causes software to be loaded onto a second NE. In a third phase, each of the first and second NEs causes software to be loaded onto a third and a fourth NE, respectively. In a fourth phase, each of the first, second, third, and fourth NEs causes software to be loaded onto a fifth, a sixth, a seventh, and an eighth NE, respectively. As a result, the number of network nodes in which software is being loaded doubles in each phase. Consequently, in the final phase, half of the network nodes (that are to have software loaded) will be loading software simultaneously. (The CMS node may also be causing software to be loaded in each of the phases thereby potentially shortening the software loading procedure.)

Continuing now with FIG. 4A, the CMS 110 formulates one or more assignments (step 416). Each assignment may be formulated in accordance with the assignment(s) 330 bracket of FIG. 3. The CMS 110 then transmits the software 315, the software load script(s) (and/or load modules) 320, and one or more assignment(s) 330 to the primary NEs (step 418). In the current example, these primary NEs correspond to the NEs 130, 160, and 180. The CMS 110 retrieves the software-loading related files 310 and possibly the assignment(s) 330 from the FS 215 (e.g., or they may be formulated in real time) under the control of the LM 210. The LM 210 then transmits the selected portion(s) of (or the entirety of) the elements encompassed by the element number 300 and its associated bracket along the communication link 115 to the X.25 network 120 and then along the communication links 135, 165, and 185 to the NE 130, the NE 160, and the NE 180, respectively.

Figure 4B:
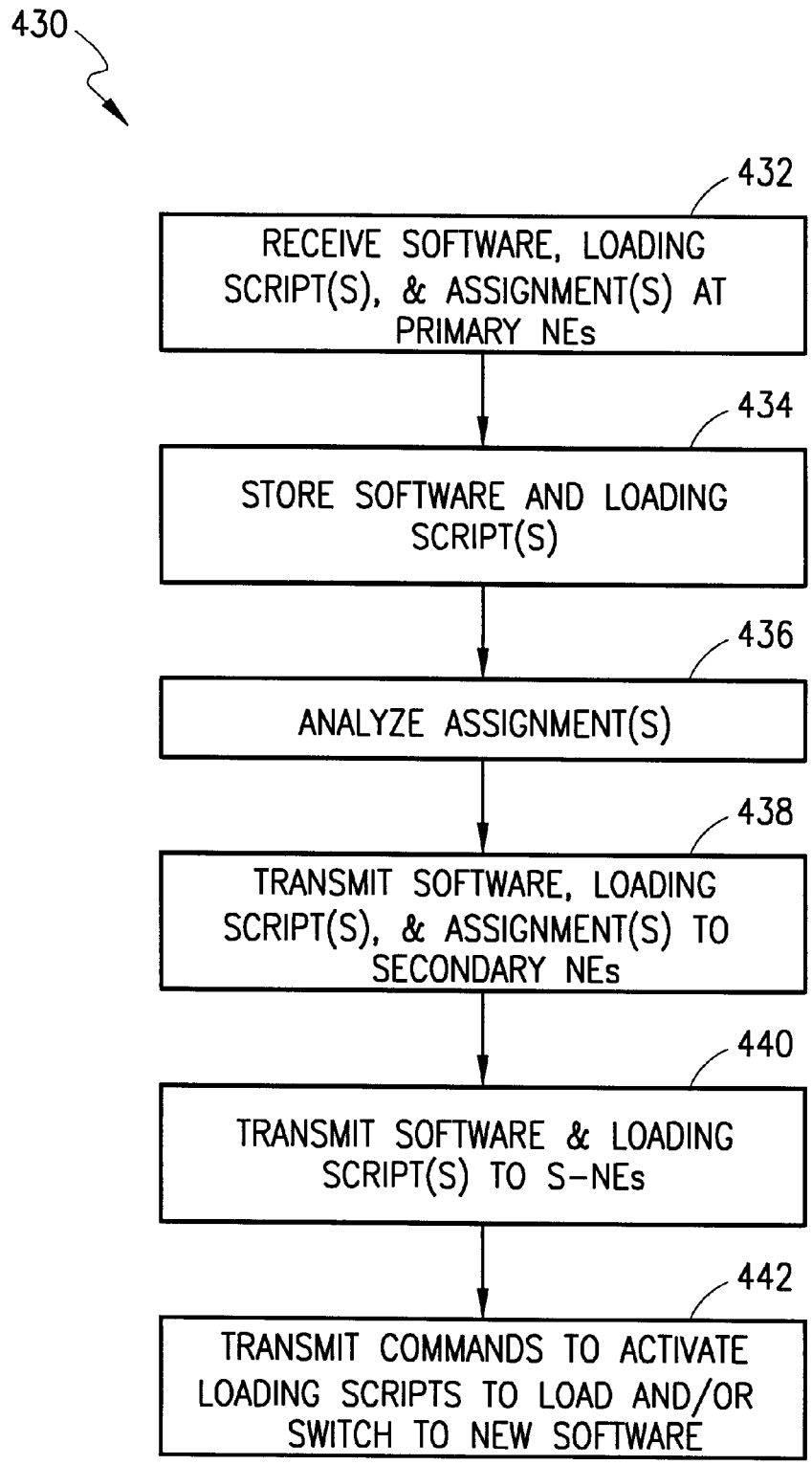
FIG. 4B illustrates a method in flowchart form for distributing software in accordance with another aspect of the present invention.

Referring now to FIG. 4B, a method in flowchart form for distributing software in accordance with another aspect of the present invention is illustrated. The flowchart 430 is directed towards aspects of software distribution related to the reception and implementation of software, other information, and instructions from the CMS 110 at the primary NEs. The primary NEs receive the software 315, the software load script(s) 320, and the assignment(s) 330 from the CMS 110 via their respective LA (step 432). In the current example, the NE 130, the NE 160, and the NE 180 receive the software-distributing information collectively (e.g., all or a portion of the element number 300 of FIG. 3) at the LA 230, the LA 260, and the LA 280, respectively, using the network 120 and the pertinent communication links. The software 315 and the load script(s) 320 are then stored for each respective NE (step 434). According to the current example, the NE 130, the NE 160, and the NE 180 store the software-loading related files 310 at the LSM 235, the LSM 265, and the LSM 285, respectively. Alternatively, each NE may (e.g., if so instructed) immediately implement the load script(s) and/or load module(s) 320 and therefore immediately load the software 315 (and possibly switch thereto, if so instructed).

The primary NEs analyze their respective received assignment(s) 330 (step 436). In response to the analysis of the assignment(s) 330, the primary NEs transmit the software 315 (or portion thereof), the load script(s) 320, and the assignment(s) 330 to the secondary NEs (step 438). The assignment(s) 330 transmitted from the primary NEs to the secondary NEs may be determined from the analysis as well. In the current example, the primary NE 160 performs this step with respect to the secondary NE 150, and the primary NE 180 performs this step with respect to the secondary NEs 140 and 170. The distribution procedure may alternatively or simultaneously continue with the method of FIG. 4C, as will be described fully hereinbelow.

The primary NEs may also transmit all or a portion of the software 315 and the loading script(s)/module(s) 320 to one or more of their respective S-NEs (as possibly instructed by the received assignment(s) 330) (step 440). In the current example, the primary NE 180 performs this step with respect to the S-NEs 182 and 184. The primary NEs may also optionally transmit one or more commands to their respective secondary target NEs and/or their respective S-NEs (step 442). The commands may activate loading script(s)/module(s) 320 in order to load (e.g., install and/or upgrade to or switch to) the recently-received software 315. It should be understood that the loading of the software may be executed automatically in response to instructions in, for example, the loading script(s)/module(s) 320 either immediately or shortly after reception or at a scheduled time thereafter. In the current example, the primary NEs 160 and 180 may issue commands to their secondary targets to initiate the software switch.

Figure 4C:
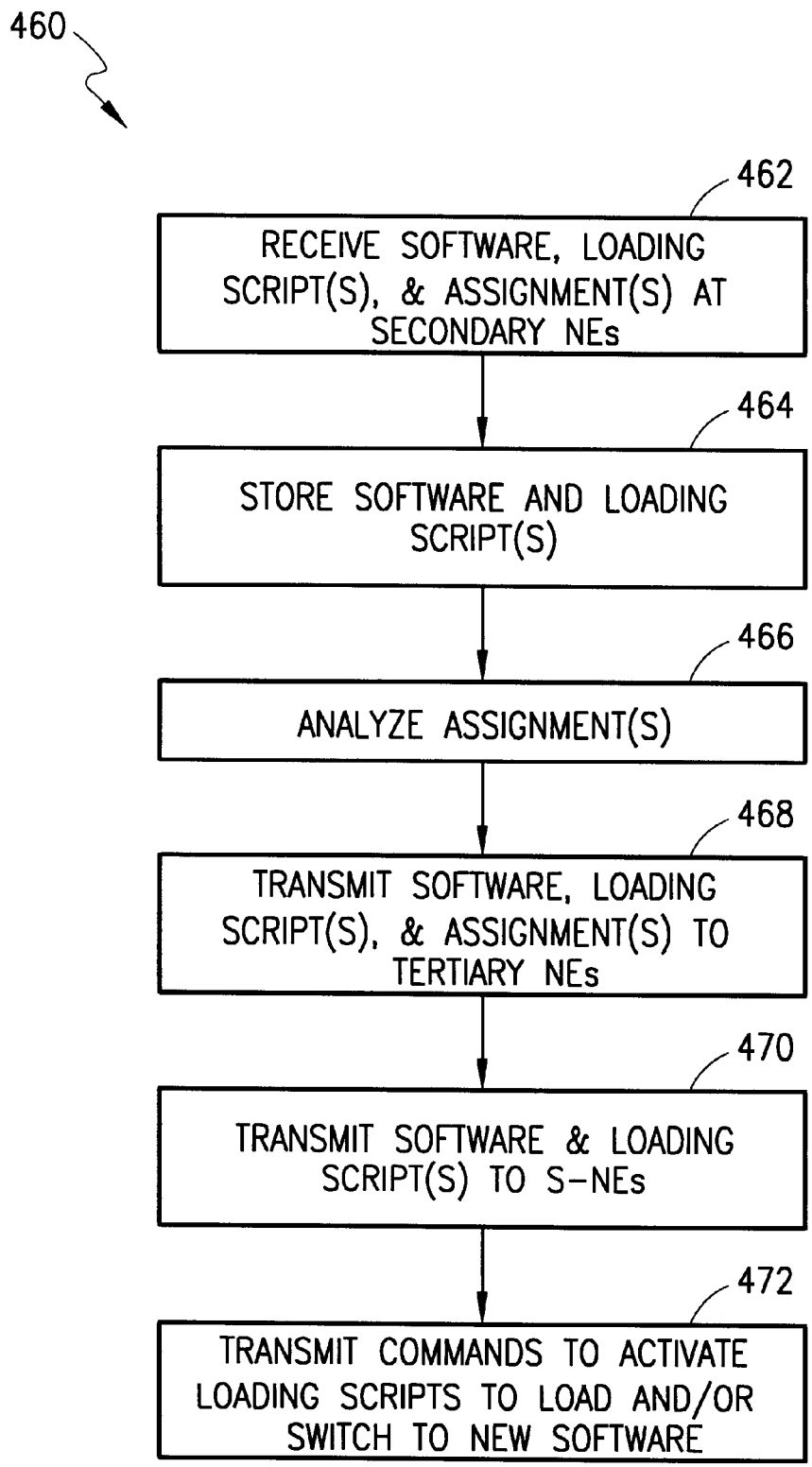
FIG. 4C illustrates a method in flowchart form for distributing software in accordance with yet another aspect of the present invention.

FIG. 4C illustrates a method in flowchart form for distributing software in accordance with yet another aspect of the present invention. The flowchart 460 is directed towards aspects of software distribution related to the reception and implementation of software, other information, and instructions from the primary NEs at the secondary NEs. The secondary NEs receive the software 315, the software load script(s) 320, and the assignment(s) 330 from the primary NEs (e.g., from the respective LAs of the primary NEs) via their respective LAs (step 462). In the current example, the NE 140, the NE ISO, and the NE 170 receive from the NE 180, the NE 160, and the NE 180, respectively. No assignment(s) 330 is received at a particular secondary NE, for example, if the particular secondary NE will not be coordinating (e.g., controlling, guiding, or instructing) the loading of software for another NE (subordinated or otherwise).

The received software 315 and loading script(s)/module(s) 320 may be stored in memory at the secondary NEs (step 464). In the current example, the NE 140, the NE 150, and the NE 170 may store the received information in the LSM 245, the LSM 255, and the LSM 275, respectively. The secondary NEs then analyze the received assignment(s) 330 (step 466). After the analysis, the secondary NEs transmit the software 315, the loading script(s)/module(s) 320, and the assignment(s) 330 to the tertiary NEs (step 468). In the current example, no NEs are tertiary NEs and this step may be unperformed. Any NE that, for example, the secondary NE 150 were to cause software to be loaded onto would be a tertiary NE. It should be noted that software may be distributed over more than three phases by extending the flowcharts 430 and 460 for instances in which tertiary NEs have target NEs (subordinated or otherwise).

The secondary NEs may also transmit all or a portion of the software 315 and the loading script(s)/module(s) 320 to one or more of their respective S-NEs (as possibly instructed by the received assignment(s) 330) (step 470). In the current example, the secondary NE 170 performs this step with respect to the S-NE 172. The secondary NEs may also optionally transmit one or more commands to their respective tertiary target NEs and/or their respective S-NEs (step 472). The commands may activate the loading script(s)/module(s) 320 in order to load (e.g., install and/or upgrade to or switch to) the recently-received software 315. It should be understood that the loading of the software may be executed automatically in response to instructions in, for example, the loading script(s)/module(s) 320 either immediately or shortly after reception or at a scheduled time thereafter. In the current example, the secondary NE 170 may issue commands to its secondary target, the S-NE 172, to initiate the software switch.

It should be noted that such initiation commands may also emanate from the CMS 110. The commands may be directed towards, for example, either only the primary targets or the entire network 100 (or at least the portion thereof that is affected by the software distribution procedure). Also, it should be understood that the steps of the flowcharts 410, 430, and 460 may be performed in orders other than that described herein. For instance, under the current example, the primary NE 180 may perform step 440 prior to performing step 438.

Although preferred embodiment(s) of the method and system of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for efficiently and reliably distributing software in a network, comprising the steps of:

transmitting a first message from a first network element to a second network element, a third network element, or both;

transmitting a second message from said second network element to said third network element if said first message is not sent to said third network element, said second message transmitted in response to said first message, and said second message including software;

loading at least a portion of said software onto said third network element; and transmitting a third message from said third network element to a fourth network element, said third message transmitted in response to said second message, and said third message including at least a portion of said software.

2. The method according to claim 1, wherein:

said network is a telecommunications network; and said first network element is an operations support system element and at least one of said second network element and said third network element is a mobile services switching center element.

3. The method according to claim 1, wherein said second network element and said third network element are both connected to a single hierarchical level of said network.

4. The method according to claim 1, wherein said step of loading at least a portion of said software onto said third network element further comprises at least one of the steps of installing a new module with said software and upgrading an existing module with said software.

5. The method according to claim 1, further comprising the steps of:

analyzing at least a portion of said network;

determining software-loading needs of said at least a portion of said network; and planning a distribution schedule of said software to reduce a total update time for said at least a portion of said network.

6. The method according to claim 1, wherein said first message comprises said software and at least one instruction related to software distribution, said software distribution pertaining to at least one of software transmission and software loading.

7. The method according to claim 6, wherein said at least one instruction related to software distribution includes an address of said third network element.

8. The method according to claim 6, wherein said at least one instruction related to software distribution includes at least one direction for responding to an extraordinary circumstance.

9. The method according to claim 6, wherein said at least one instruction related to software distribution includes a time for executing said step of transmitting a second message from said second network element to a third network element.

10. The method according to claim 1, wherein said step of loading at least a portion of said software onto said third network element occurs in response to a command transmitted over said network by at least one of said first network element and said second network element.

11. The method according to claim 1, wherein said second message comprises at least one instruction related to software distribution, said software distribution pertaining to at least one of software transmission and software loading.

12. The method according to claim 1, wherein said second, third, and fourth network elements are all connected to one hierarchical level of said network.

13. The method according to claim 1, wherein said second and third network elements are both connected to one hierarchical level of said network while said fourth network element is not directly connected to said one hierarchical level of said network.

14. The method according to claim 1, further comprising the step of:

loading at least a portion of software received in said first message onto said second network element in response to said first message.

15. A method for efficiently and reliably distributing software in a communications network, comprising the steps of:

transmitting a first message from a first network element to a second network element, a third network element, or both, said second network element connected by a single sub-network of the communications network to said first network element, and said first message including software;

transmitting a second message from said second network element to said third network element if said first message is not sent to said third network element, said third network element connected by a single sub-network of the communications network to said first and second network elements, said second message transmitted in response to said first message, and said second message including at least a portion of said software;

loading said at least a portion of said software onto said third network element based, at least in part, on information included within at least one of said first message and said second message; and transmitting a third message from said third network element to a fourth network element, said third message transmitted in response to said second message, and said third message including at least a portion of said software.

16. The method according to claim 15, wherein said first message includes information selected from a group comprised of files for loading said software, instructions for specifying one or more portions of said software, and schedules for timing software distribution or software activation.

17. A system for efficiently and reliably distributing software in a network, comprising:

a first network element, said first network element capable of transmitting a first message from said first network element to a group consisting of a second network element and a third network element;

said first network element, said second network element, and said third network element in communication via a common sub-set of said network;

said second network element adapted to receive said first message from said first network element and transmit a second message to said third network element if said first message is not sent to said third network element, said second message transmitted in response to said first message, and said second message including software;

wherein said third network element loads at least a portion of said software received as part of at least one of said first message and said second message; and said third network element adapted to transmit a third message from said third network element to a fourth network element, said third message transmitted in response to said second message, and said third message including at least a portion of said software.

18. The system according to claim 17, wherein:

said network is a telecommunications network; and said first network element is an operations support system network element and at least one of said second network element and said third network element is a mobile services switching center network element.

19. The system according to claim 17, wherein the loading of said at least a portion of said software by said third network element further comprises installing a new module with said software or upgrading an existing module with said software.

20. The system according to claim 17, wherein said first network element is further capable of:

analyzing at least a portion of said network;

determining software-loading needs of said at least a portion of said network; and planning a distribution schedule of said software to reduce a total update time for said at least a portion of said network.

21. The system according to claim 17, wherein said first message comprises said software and at least one instruction related to software distribution, said software distribution pertaining to at least one of software transmission and software loading.

22. The system according to claim 21, wherein said at least one instruction related to said software distribution includes an address of said third network element.

23. The system according to claim 21, wherein said at least one instruction related to said software distribution includes at least one direction for responding to an extraordinary circumstance.

24. The system according to claim 21, wherein said at least one instruction related to said software distribution includes a time for said second network element to transmit said second message to said third network element.

25. The system according to claim 17, wherein the loading of said at least a portion of said software by said third network element occurs in response to a command transmitted over said common sub-set of said network by at least one of said first network element and said second network element.

26. The system according to claim 17, wherein said second message comprises at least one instruction related to software distribution, said software distribution pertaining to at least one of software transmission and software loading.

27. The system according to claim 26, wherein said third message is transmitted in response to said at least one instruction related to software distribution; and wherein said first, second, third, and fourth network elements are in communication via said common sub-set of said network.

28. The system according to claim 17, wherein said fourth network element loads said at least a portion of said software, said fourth network element not being in direct communication with said first network element via said common sub-set of said network.

29. The system according to claim 17, wherein said second network element loads at least a portion of software received in said first message onto said second network element in response to said first message, said first message being received from said first network element via said common sub-set of said network.

30. The system according to claim 17, wherein:

said first network element comprises a file store and a load manager; and said second and third network elements each comprise a local storage media and a load agent.

* * * * *

UNITED STATES PATENT AND TRADEMARK OFFICE
CERTIFICATE OF CORRECTION

PATENT NO. : 6,289,511 B1
DATED : September 11, 2001
INVENTOR(S) : Ulf Hübinette It is certified that error appears in the above-identified patent and that said Letters Patent is hereby corrected as shown below:

Column 6,
Line 8, delete "," (first occurrence) replace with -- . --
Line 50, delete "uging" replace with -- using --

Column 7,
Line 65, delete "assignments" replace with -- assignment(s) --

Signed and Sealed this

Twenty-first Day of May, 2002

Attest:

Attesting Officer

JAMES E. ROGAN
Director of the United States Patent and Trademark Office